United States Patent [19]
Luciani et al.

[11] Patent Number: 6,103,655
[45] Date of Patent: Aug. 15, 2000

[54] CARRIER FOR OLEFIN POLYMERIZATION CATALYSTS

[75] Inventors: Luciano Luciani, Ferrara, Italy; Wolfgang Neissl, Lichtenberg; Norbert Hafner, Linz, both of Austria

[73] Assignee: Borealis GmbH, Schwechat-Mannswörth, Austria

[21] Appl. No.: 09/023,802

[22] Filed: Feb. 13, 1998

[30] Foreign Application Priority Data

Feb. 17, 1997 [EP] European Pat. Off. .............. 97102499

[51] Int. Cl.$^7$ .............................. B01J 31/00; B01J 37/00; B01J 27/138; B01J 20/10; C08F 4/44

[52] U.S. Cl. ...................... 502/117; 502/104; 502/107; 502/110; 502/115; 502/118; 502/119; 502/127; 502/129; 502/133; 502/134; 502/226; 502/227; 502/228; 502/411; 526/124.6

[58] Field of Search ..................... 502/117, 104, 502/107, 110, 115, 118, 119, 127, 129, 133, 134, 226–228, 411; 526/124.6

[56] References Cited

U.S. PATENT DOCUMENTS

| | | | |
|---|---|---|---|
| 4,149,990 | 4/1979 | Giannini et al. | 502/104 |
| 4,315,835 | 2/1982 | Scata et al. | 252/429 B |
| 4,530,980 | 7/1985 | Radici | 526/73 |
| 4,537,870 | 8/1985 | Hawley | 502/111 |
| 4,548,915 | 10/1985 | Goodall et al. | 502/104 |
| 4,639,430 | 1/1987 | Pasquet et al. | 502/120 |
| 4,673,661 | 6/1987 | Lofgren et al. | 502/111 |
| 4,724,225 | 2/1988 | Shimizu et al. | 502/107 |
| 4,780,438 | 10/1988 | Garoff et al. | 502/107 |
| 5,006,620 | 4/1991 | Zolk et al. | 526/128 |
| 5,064,798 | 11/1991 | Chang | 502/111 |
| 5,173,465 | 12/1992 | Luciani et al. | 502/107 |
| 5,188,997 | 2/1993 | Luciani et al. | 502/107 |
| 5,258,342 | 11/1993 | Luciani et al. | 502/107 |
| 5,270,275 | 12/1993 | Luciani et al. | 502/116 |
| 5,278,117 | 1/1994 | Luciani et al. | 502/113 |
| 5,298,474 | 3/1994 | Luciani et al. | 502/115 |
| 5,310,716 | 5/1994 | Luciani et al. | 502/107 |
| 5,320,995 | 6/1994 | Luciani et al. | 502/107 |
| 5,399,638 | 3/1995 | Brun et al. | 502/108 |
| 5,407,883 | 4/1995 | Fushimi et al. | 502/125 |
| 5,739,224 | 4/1998 | Luciani et al. | 526/124.5 |

FOREIGN PATENT DOCUMENTS

| | | |
|---|---|---|
| 0 776 912 | 6/1997 | European Pat. Off. . |
| 2452498 | 10/1980 | France . |
| 2049709 | 12/1980 | United Kingdom . |
| WO92/11296 | 7/1992 | WIPO . |

*Primary Examiner*—Mark L. Bell
*Assistant Examiner*—Patricia L. Hailey
*Attorney, Agent, or Firm*—Wenderoth, Lind & Ponack, L.L.P.

[57] ABSTRACT

Procedure for the preparation of a solid carrier for olefin polymerization catalysts, comprising the steps:

a) impregnating a silica with Mg-chloride solubilized in ethylbenzoate, in the presence of further electron donors, b) optionally drying the impregnated silica obtained in (a) and impregnating it with a solution of Mg-alkyls in $SiCl_4$ at a temperature from −10 to 20° C. and subsequently treating the obtained slurry at a temperature from 40° C. to reflux temperature, optionally adding a further amount of electron donors, c) drying the obtained carrier.

The carrier which is obtained according to the above procedure is advantageously used for the preparation of supported catalysts for the polymerization of olefins.

15 Claims, No Drawings

CARRIER FOR OLEFIN POLYMERIZATION CATALYSTS

The present invention relates to a procedure for producing a carrier (or support) to be used for the preparation of catalysts for polymerizing α-olefins alone or in mixture.

α-olefins such as ethylene, propylene and higher olefin monomers can be polymerized by using Ziegler-Natta-catalysts based on a combination of organometallic compounds of elements of groups IA to IIIA and a compound of a transition metal belonging to groups IVB to VIB of the periodic table (e.g. in Boor Jr, Ziegler-Natta-Catalysts and Polymerization, Academic Press, New York, 1979).

To improve the morphology of the resin, it is moreover known to impregnate a granular solid of microspheroidal carrier with the catalyst (Karol F. J., Cat. Rev. Sci. Eng. 26, 384, 557–595, 1984). Among others, silica can be used as a catalyst carrier for a-olefin polymerization.

It is important to use an appropriate selective carrier for the preparation of (X-olefin catalyst preparation, which can be impregnated with the active part of the catalysts, thereby enhancing the properties.

Various proposals have been made in the art for preparing a carrier and subsequently a catalyst for olefin polymerization. From EP-A-776,912, a catalyst for the polymerization of olefins is known, which is prepared by impregnating a silica with a Mg-halide and a Mg-alkyl, halogenating and then impregnating with a Ti-tetrahalide.

According to U.S. Pat. No. 5,310,716, a non preactivated silica (containing hydroxyl groups and water) is treated with Mg-alkyl and then (after removing the liquid, washing and drying) with tetrachlorosilane, whereby a carrier is obtained. After this step, a treatment with an excess of Ti-tetrachloride and donor is carried out.

According to U.S. Pat. No. 5,006,620 a silica is treated with Mg-alkyl, then with chlorine or hydrochloric acid and with a $C_{1-8}$-alkanol for attaining a carrier, which is subsequently treated with an excess of Ti-tetrachloride and donor for achieving a catalyst.

According to U.S. Pat. No. 4,639,430, a silica is impregnated with Mg-chloride (dissolved in water), dried, mixed with $NH_4Cl$ and treated at high temperature, whereby a carrier with a minimum content of hydroxyl groups is obtained. This support is then impregnated with heptane, containing a very small amount of Ti-tetrachloride for attaining a catalyst for the preparation of polyethylene or for ethylene-propylene rubbers.

In the field of catalyst research it is still strongly desirable to find new catalyst components or catalyst systems with improved performance, especially with high activity and/or high stereoregularity.

According to the present invention, it has now been found that a silica can be treated with solubilized Mg-chloride in the presence of further electron donors, and optionally with a solution of Mg-alkyls dissolved in Si-tetrachloride at low temperature and subsequently heating to reflux temperature, whereby active Mg-chloride is precipitated.

The present invention accordingly provides a procedure for the preparation of a solid carrier for olefin polymerization catalysts, comprising the steps:

a) impregnating a silica with Mg-chloride solubilized in ethylbenzoate, in the presence of further electron donors, b) optionally drying the impregnated silica obtained in (a) and impregnating it with a solution of Mg-alkyls in $SiCl_4$ at a temperature from −10 to 20° C. and subsequently treating the obtained slurry at a temperature from 40° C. to reflux temperature, optionally adding a further amount of electron donors, c) drying the obtained carrier.

We have moreover found that by treating this carrier (or support) with Ti-tetrachloride or a mixture of Ti-tetrachloride and Ti-alkoxide, highly active catalysts for stereoregular polypropylenes (PP) and for polyethylene (PE), including their copolymers and PP-PE-rubbers, are obtained.

The silica suitable for the support is preferably a spheroidal, porous silica with a particle size of 15 to 150 micron, with a surface area of 100 to 500 $m^2/g$, a pore volume of 1.2 to 3 ml/g and an average pore diameter of 20 to 500 angstrom. The silica does not contain free water and has preferably a content of hydroxyl groups of 0 to 5 mmol/g, more preferred of 0.1 to 3 mmol/g and most preferred of 0.5 to 1 mmol/g.

According to the invention, it is further preferred that the silica obtained after the impregnation step (a) contains less than 6% wt of Mg, referred to the final carrier, and that the carrier obtained in step (c) contains 2 to 10% wt, preferably 5 to 8% wt of Mg, referred to the final carrier.

In step (a) of the invention, the silica is directly impregnated with Mg-chloride, whereas an additional amount of Mg-chloride can optionally be brought into the silica by the reaction of Mg-alkyl and $SiCl_4$, which are added and reacted in step (b), whereby especially at the higher temperatures said additional Mg-chloride is precipitated. The weight ratio of Mg-chloride from step (a): Mg-chloride from step (b) is preferably in the range of 0.1:1 to 10:1, more preferred between 0.2:1 to 5:1 and most preferred between 0.5:1 to 2:1.

Further preferred is a molar ratio of Mg-alkyl: $SiCl_4$ from 1:5 to 1:30.

Phthalic acid esters are preferred as further donors (additional to ethylbenzoate, which also acts as an electron donor), the most preferred donor is diisobutylphthalate (DIBP). The further donors are preferably used in an amount of 20 to 100% wt. referred to the silica, but it is also possible to use higher amounts of donors.

The Mg-alkyls used in optional step (b) are preferably Mg-alkyls with 1 to 10 C–atoms in the alkyl group. Most preferred are Mg-diethyl, Mg-ethylbutyl, Mg-dihexyl and Mg-butyloctyl.

According to the present invention, the procedure will preferably comprise the following steps:

In the first step of the invention, the silica is suspended in a solution of Mg-chloride in ethylbenzoate (EB) in the presence of DIBP, the amount of DIBP being 20 to 100% wt, preferably 60% wt, referred to the silica. The impregnation of the silica with Mg-chloride dissolved in EB can be carried out in one or more steps. The amount of Mg to be impregnated in the form of Mg-chloride is 1 to 6% wt, preferably 4% wt. referred to the final carrier.

The above slurry is then heated for 2 h at reflux under stirring, and then EB is distilled off.

The dried carrier can directly be used for catalyst preparation. In a further preferred procedure it can subsequently be submitted to another impregnation step, using a solution of Mg-alkyl in Si-tetrachloride. Preferred as Mg-alkyls are Mg-diethyl, Mg-ethylbutyl, Mg-butyloctyl and Mg-dihexyl. The amount of Mg to be impregnated in this step in the form of e.g. Mg-dihexyl, which is then converted to Mg-chloride at higher temperatures, is 1 to 9% wt, preferably 1 to 4% wt, referred to the final carrier.

After 2 h stirring at about 0° C., the temperature is increased to reflux and maintained for 2 h at this value, whereby Mg-chloride is precipitated into the pores of the silica. At this step the diluent is removed and after drying the carrier is ready to be used for catalyst preparation.

The invention further concerns a procedure for the preparation of a supported catalyst for the polymerization of α-olefins, wherein a carrier (or support) obtained according to the invention, is contacted with a transition metal halide of group IVb, Vb or VIb of the periodic table, and optionally with electron donors. Preferably Ti-tetrachloride is used as the transition metal halide, optionally in the presence of a Ti-alkoxyde. The Ti-tetrachloride may be used undiluted or as a solution in organic solvents, e.g. in toluene or ethylbenzene.

The supported catalyst as described above can be advantageously used in bulk, slurry or gas phase processes for the preparation of polyolefins by homopolymerization or copolymerization with two or more monomers. The catalyst can be used also in the polymerization of ethylene as it is or omitting internal and external donors.

The present invention further relates to a process for the preparation of polyolefins by homopolymerization or copolymerization of olefins, wherein a supported catalyst as described above is used. The polymerization is conducted according to conventional methods, operating in a liquid phase, either in the presence or in the absence of an inert hydrocarbon diluent, or in gas phase.

The catalyst of the invention can be used also at higher temperatures, whereby the polymerization is preferably carried out at a temperature of about 20° to 150° C., more preferred between 70° C. and 120° C., at atmospheric pressure or at a higher pressure, in absence or in presence of hydrogen.

The catalyst of the present invention shows an improved performance, and permits also to achieve very low values of extractable amorphous resins in boiling n-heptane and xylene, e.g. for polypropylene.

Many other α-olefins can also be polymerized using this catalyst, like butene-1, 4-methyl-i-pentene, hexene-1, alone or in mixture with other α-olefins for obtaining copolymers and terpolymers, mainly of rubber type.

The use of this catalyst permits moreover to obtain controlled polymer particle size of the desired dimension on the basis of the choice of the selected silica.

EXAMPLE 1

Carrier Preparation:

20 g of silica, treated at 740° C. for 16 hours (resulting in 1.12 mmol/g of hydroxyl groups) with a surface area of 150–300 m$^2$/g, pore volume of 1.58 ml/g and an average particle size of 75 micron, are charged in nitrogen atmosphere into a 1000 ml flask equipped with a reflux cooler, mechanical stirrer and thermometer, containing 4 g MgCl$_2$ solublized in 400 ml ethylbenzoate and 10 ml DIBP. The slurry is stirred for 2 hours at 190° C. and then ethylbenzoate is distilled off under vacuum achieving a solid precursor.

In a second flask, 135 ml SiCl$_4$ are cooled to 1° C. and 80 ml of a solution of Mg(hexyl)$_2$ in heptane (20%wt) are added slowly, resulting in a clear solution. This cold solution (1° C.) is added slowly to the above precursor, always cooling the flask and stirring. After getting a homogeneous slurry, the temperature is increased to the reflux (70° C.), and the slurry is stirred at this temperature for 2 hours. After washing two times with 300 ml n-heptane and two times with 300 ml n-pentane and drying, the carrier is ready to be used to prepare a catalyst for polymerization or copolymerization of ethylene, propylene and other alpha-olefines.

Catalyst preparation:

The carrier, obtained as described above, is treated under stirring at 110° C. with 120 ml TiCl$_4$ for 1.5 hours. After filtering at 110° C., a treatment with a mixture of TiCl$_4$ and toluene (50/50 v/v) at 100° C. for 1.5 hours and subsequent filtration at this temperature is carried out twice. After final filtration, the solid material is washed 5 times with n-heptane at about 100° C. After further two washing treatments with n-pentane at room temperature and drying 36.3 g of the solid catalyst component in form of a grey, free flowing powder were obtained containing, 2.38% wt Ti, 5.79% wt Mg and 22.9% wt Cl.

Polymerization:

The activity and stereospecifity of this solid catalyst component were determined in runs of propylene polymerization in liquid monomer using aluminumtrialkyls treated with electron-donor compounds as a cocatalyst:

An autoclave of 5 l equipped with a magnetic stirrer was filled with 1385 g propylene and 10 l H$_2$, used as a molecular weight modifier. About 35 mg of solid catalyst component were mixed with a complex of triethylaluminiumdipentyldimethoxysilane (20:1 mol/mol) in a ratio of 100:1 (mol Al/mol Ti) and introduced into the autoclave. After heating to 70° C., the polymerization was running for two hours and then the remaining propylene was flashed off. The polymer was stabilized and dried at 50° C. under vacuum. A yield equal to 4.6 kg PP per g of solid catalyst component and equal to 191 kg PP per g of Ti was achieved with the following characteristics:

MFI (2,16 kg; 230° C. ASTMD 1238 L)=9.42
bulk density (g/ml)=0.441
isotactic index (%)=97.4
xylene cold solubles (% wt)=2.32

What is claimed is:

1. Procedure for the preparation of a solid carrier for olefin polymerization catalysts, comprising the steps:
   a) impregnating a silica with Mg-chloride solubilized in ethylbenzoate, in the presence of further electron donors,
   b) optionally drying the impregnated silica obtained in (a);
   c) impregnating said silica with a solution of Mg-alkyls in SiCl$_4$ at a temperature from −10 to 20° C. and subsequently treating the obtained slurry at a temperature from 40° C. to reflux temperature, optionally adding a further amount of electron donors; and
   d) drying the obtained carrier.

2. Procedure according to claim 1, wherein the carrier obtained in step (d) contains 2 to 10% wt, of Mg, referred to the final carrier.

3. Procedure according to claim 2, wherein the carrier obtained in step d) contains 5 to 8% wt of Mg, referred to the final carrier.

4. Procedure according to claim 1, wherein the silica obtained after the impregnation step (a) contains less than 6% wt of Mg, referred to the final carrier.

5. Procedure according to claim 1, wherein the silica has a content of OH-groups of 0 to 5 mM/g.

6. A Procedure according to claim 1, wherein the silica is spheroidal and porous without a content of free water, and having an average particle size of 15 to 150 micron, a surface area of 100 to 500 m²/g, a pore volume of 1.2 to 3 ml/g and an average pore diameter of 20 to 500 angstrom.

7. Procedure according to claim 1, wherein the molar ratio of Mg-alkyl: SiCl$_4$ is from 1:5 to 1:30.

8. Procedure according to claim 1, wherein phthalic acid esters are used as further donors.

9. Procedure according to claim 8, wherein diisobutylphthalate is used as the further donor.

10. Procedure according to claim 1, wherein the further donors are used in an amount of 20 to 100% wt, referred to the silica.

11. Procedure according to claim 1, wherein the Mg-alkyl is a Mg-diethyl, Mg-ethylbutyl, Mg-dihexyl or Mg-butyloctyl.

12. Procedure for the preparation of a supported catalyst for the polymerization of α-olefins, wherein a carrier (or support) obtained according to claim 1, is contacted with a transition metal halide of group IVb, Vb or VIb of the periodic table, and optionally with electron donors.

13. Process for the preparation of polyolefins by homopolymerization or copolymerization of olefins, triethylaluminiumdipentyldimethoxysilane.

14. The supported catalyst produced by the procedure of claim 12.

15. The carrier produced by the procedure of claim 1.

* * * * *